United States Patent [19]
Mok

[11] Patent Number: 6,141,229
[45] Date of Patent: Oct. 31, 2000

[54] VOLTAGE BOOSTING CIRCUIT AND METHOD THEREOF

[75] Inventor: Do-sang Mok, Seoul, Rep. of Korea

[73] Assignee: Samsung Electronics Co., LTD, Rep. of Korea

[21] Appl. No.: 09/348,207

[22] Filed: Jul. 8, 1999

[30] Foreign Application Priority Data

Sep. 8, 1998 [KR] Rep. of Korea ............ 98-36994

[51] Int. Cl.[7] ............ H02M 3/18; H02M 7/00
[52] U.S. Cl. ............ 363/60; 307/110
[58] Field of Search ............ 363/59, 60; 307/110, 307/109

[56] References Cited

U.S. PATENT DOCUMENTS

| | | | |
|---|---|---|---|
| 3,942,047 | 3/1976 | Buchanan | 307/297 |
| 4,016,476 | 4/1977 | Morokawa et al. | 321/15 |
| 4,271,461 | 6/1981 | Hoffmann et al. | 363/60 |
| 4,935,644 | 6/1990 | Tsujimoto | 307/296.2 |
| 5,008,799 | 4/1991 | Montalvo | 363/60 |
| 5,267,201 | 11/1993 | Foss et al. | 365/189.09 |
| 5,280,420 | 1/1994 | Rapp | 363/60 |
| 5,392,205 | 2/1995 | Zavaleta | 363/59 |
| 5,629,843 | 5/1997 | Loughmiller et al. | 363/60 |
| 5,712,777 | 1/1998 | Nicollini et al. | 363/60 |
| 5,805,435 | 9/1998 | Pascucci | 363/59 |

*Primary Examiner*—Peter S. Wong
*Assistant Examiner*—Bao Q. Vu
*Attorney, Agent, or Firm*—Samuels, Gauthier & Stevens, LLP

[57] ABSTRACT

A voltage boosting circuit and method thereof are capable of boosting an input voltage to a desired voltage while consuming a relatively small amount of power, in a highly efficient manner, and requiring a small number of circuit elements. A first switch of the voltage boosting circuit transfers the input voltage in response to a first control signal. A first charging/pumping portion charges the input voltage transferred from the first switch in response to a second control signal, adds the charged voltage to a first predetermined voltage in response to a third control signal, and pumps the addition result in response to the third control signal to provide a boosted voltage.

21 Claims, 9 Drawing Sheets

VOLTAGE BOOSTING CIRCUIT AND METHOD THEREOF

BACKGROUND OF THE INVENTION

1. Field of the Invention

The present invention relates to an integrated circuit (IC), and more particularly, to a voltage boosting circuit and method thereof capable of efficiently boosting an input voltage at a limited level to an output voltage at an enhanced level.

2. Description of the Related Art

As the degree of integration of Large Scaled Integrated LSI circuits, commonly used in contemporary electronic devices, increases, it is desirable for the supply voltage level, i.e., input voltage applied to the device, to be decreased, in order to reduce power consumption. However, with an input voltage at a decreased level, it is often difficult to obtain the operating speed required by the LSI circuit. Integration further increases parasitic capacitance in the LSI circuit, due to long and complex metal lines formed in the chip, in turn further decreasing the input voltage level. Accordingly, the operating speed is reduced and the likelihood of malfunction is increased.

For this reason, contemporary semiconductor devices commonly include an internal voltage boosting circuit which boosts the externally provided supply voltage to generate a boosted voltage at a higher level, in order to improve operating speed and maintain a suitable operating voltage required for performing the complex and various functions associated with the device.

Conventional voltage boosting circuits are disclosed in U.S. Pat. Nos. 3,942,047, 4,271,461 and 4,016,476, the contents of which are incorporated herein by reference. Such conventional circuits are of a complex configuration and therefore, when the boosting circuit is integrated into the device, chip surface area is consumed. Furthermore, such complex conventional voltage boosting circuits are of relatively low efficiency as they can consume system power to a degree that has an adverse effect on the boosted voltage level.

SUMMARY OF THE INVENTION

To address the aforementioned shortcomings, it is a first object of the present invention to provide a voltage boosting circuit using a less complex configuration, capable of boosting an Do input voltage to desired multiple levels, while consuming a relatively small amount of power, thereby leading to more efficient operation. It is a second object to provide a voltage boosting method having these advantageous characteristics.

To achieve the first object, the apparatus of the present invention is directed to a voltage boosting circuit for boosting an input voltage, and for outputting a boosted output voltage, comprising switching means and a first charging/pumping means. The first switching means transfers the input voltage in response to a first control signal. The first charging/pumping means charges the input voltage transferred from the first switching means in response to a second control signal. The resulting charged voltage is added to a first predetermined voltage in response to a third control signal, and the addition result is pumped in response to the third control signal to provide the boosted output voltage.

To achieve the second object, the method of the present invention is directed to a method for boosting the level of an input voltage to a target level, and for obtaining a boosted voltage having the target level. The input voltage is charged and added to a first predetermined voltage. Next, it is determined whether the voltage level of the addition result is at or near the target level. The addition result is further charged when the level of the addition result is not the target level. The charged result is added to a second predetermined voltage. It is next determined whether the addition of the charged result level and the second predetermined voltage level is at or near the target level. If not, the addition result is again further charged. When the voltage level of the addition result is at or near the target voltage, that voltage level is output as the boosted voltage.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
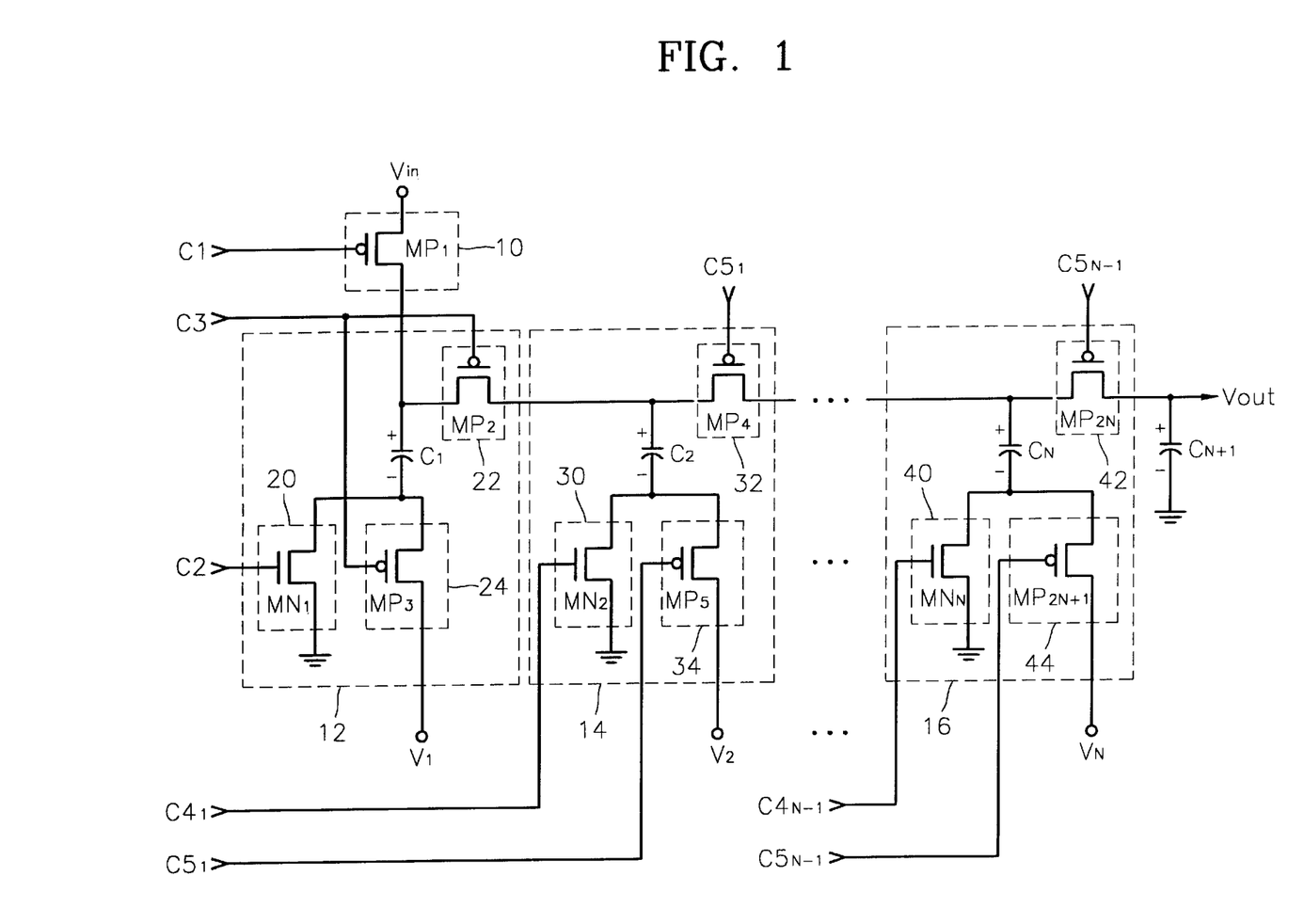
FIG. 1 is a circuit diagram of a preferred embodiment of a voltage boosting circuit according to the present invention.

Referring to FIG. 1, the voltage boosting circuit according to a preferred embodiment of the present invention includes a first switching transistor 10, first through Nth charging/pumping portions 12, 14, . . . , and 16, and a capacitor $C_{N+1}$.

The first switching transistor 10 of the voltage boosting circuit shown in FIG. 1 transfers the input voltage Vin to the first charging/pumping portion 12, in response to a first control signal C1. The first switching transistor 10, for example, can be implemented as a PMOS transistor $MP_1$ having a gate connected to the first control signal C1, and a source and a drain connected between the input voltage Vin and the first charging/pumping portion 12. Other implementations of the first switching transistor 10 are possible, as described below.

The first charging/pumping portion 12 charges the input voltage Vin transferred from the first switching transistor 10 in response to a second control signal C2, combines or adds the charged voltage to a first predetermined voltage $V_1$ in response to a third control signal C3 and pumps the addition result in response to the third control signal C3. In order to achieve this operation, the first charging/pumping portion 12 includes a capacitor $C_1$, a second switching transistor 20, a third switching transistor 24 and a fourth switching transistor 22. Capacitor $C_1$ has a positive electrode, or plate (+), electrically coupled to the input voltage Vin transferred from the first switching transistor 10. The second switching transistor 20 connects the negative plate (−) of the capacitor $C_1$ to a reference voltage, i.e., ground, in response to the second control signal C2. The third switching transistor 24 connects the negative plate (−) of the capacitor $C_1$ to the first predetermined voltage $V_1$, in response to the third control signal C3. The fourth switching transistor 22 transfers the voltage at the positive plate (+) of the capacitor $C_1$ to the positive plate (+) of the capacitor $C_{N+1}$ of adjacent charging/pumping stage 14, . . ., and 16, in response to the third control signal C3. In a preferred embodiment, the level of the first predetermined voltage $V_1$ is not more than that of the input voltage Vin. Therefore, the voltage boosting circuit shown in FIG. 1 can boost the input voltage Vin to greater than Vin and not more than 2*Vin.

In the embodiment of the present invention shown in FIG. 1, each of the second, third and fourth switching transistors 20, 22 and 24 may be implemented as a MOS transistor. That is, the second switching transistor 20 is implemented as an NMOS transistor $MN_1$ having a gate connected to the second control signal C2, and a drain and a source connected between the negative plate (−) of the capacitor C, and the reference voltage. The third switching transistor 24 is implemented as a PMOS transistor $MP_3$ having a gate connected to the third control signal C3, and a source and a drain connected between the negative plate (−) of the capacitor $C_1$ and the first predetermined voltage $V_1$. The fourth switching transistor 22 is implemented as a PMOS transistor $MP_2$ having a gate connected to the third control signal C3, and a source and a drain connected between the positive plate (+) of the capacitor $C_1$ and the second charging/pumping portion 14.

Here, the first and the second control signals C1 and C2 are simultaneously activated or inactivated, and the first control signal C1 (or, the second control signal C2) and the third control signal C3 are alternately inactivated or activated, so that the first charging/pumping portion 12 can alternately perform the charging operation and the pumping operation.

In addition, the voltage boosting circuit shown in FIG. 1 can be further provided with second through Nth (2<N) charging/pumping portions 14, . . . , and 16 between the first charging/pumping portion 12 and the capacitor $C_{N+1}$, according to the boosting level required for boosting the input voltage Vin. The Xth (2<X<N) charging/pumping portion, which is one of the second through Nth charging/pumping portions 14, .. ., and 16, charges the result pumped from the X−1th charging/pumping portion in response to the fourth control signal $C4_{X-1}$, adds the charged voltage to the second predetermined voltage $V_X$ in response to the fifth control signal $C5_{X-1}$, and pumps the addition result in response to the fifth control signal $C5_{X-1}$. Here, in a preferred embodiment, the level of the second predetermined voltage $V_X$ is not more than that of the input voltage Vin as in the first predetermined voltage $V_1$. In this manner, the voltage boosting circuit shown in FIG. 1 may boost the input voltage Vin to any multiple of the input voltage, for example, exceeding 2*Vin.

The Nth charging/pumping portion 16 further pumps the addition result to the capacitor $C_{N+1}$, and the voltage charged in the capacitor $C_{N+1}$ is output as the boosted voltage through an output terminal Vout. In order to achieve this, the Nth charging/pumping portion includes a capacitor $C_N$, a fifth switching transistor 40, a sixth switching transistor 44, and a seventh switching transistor 42. Here, the positive plate (+) of the capacitor $C_N$ is electrically coupled to the result pumped from the N−1th charging/pumping portion. The fifth switching transistor 40 connects the negative plate (−) of the capacitor $C_N$ to the reference voltage, i.e., ground, in response to the fourth control signal $C4_{N-1}$. The sixth switching transistor 44 connects the negative plate (−) of the capacitor $C_N$ to the second predetermined voltage $V_N$, in response to the fifth control signal $C5_{N-1}$. The seventh switching transistor 42 transfers the voltage at the positive plate (+) of the capacitor $C_N$ to the capacitor $C_{N+1}$, in response to the fifth control signal $C5_{N-1}$. Here, the fourth and the fifth control signals $C4_{N-1}$ and $C5_{N-1}$ are alternately activated or deactivated.

In one embodiment of the present invention shown in FIG. 1, the respective fifth, sixth and seventh switching transistors 40, 44, and 42 may be implemented by MOS transistors. That is, the fifth switching transistor 40 is implemented by an NMOS transistor MNx having a gate connected to the fourth control signal $C4_{X-1}$, and a drain and a source connected between a negative plate (−) of the capacitor $C_X$ and the reference voltage. The sixth switching transistor 44 is implemented by a PMOS transistor $MP_{2X+1}$ having a gate connected to the fifth control signal $C5_{X-1}$, and a source and a drain connected between the negative plate (−) of the capacitor Cx and the second predetermined voltage Vx. The seventh switching transistor is implemented by a PMOS transistor $MP_{2x}$ having a gate connected to the fifth control signal $C5_{X-1}$, and a source and a drain connected between the positive plate (+) of the capacitor $C_X$ and the positive plate (+) of the capacitor $C_{X+1}$. If X=2, the fifth, sixth and seventh switching transistors correspond to 30, 34 and 32 shown in FIG. 1, respectively.

The above-described the first through the fifth control signals C1, C2, C3, $C4_{X-1}$ and $C5_{X-1}$ can be generated from a pulse generator (not shown). Here, the pulse generator receives a system clock signal, multiplies or divides the frequency of the received system clock signal by a predetermined number, and outputs signals having a multiplied or divided frequency as the first through fifth control signals C1, C2, C3, $C4_{X-1}$ and $C5_{X-1}$.

Figure 2A:
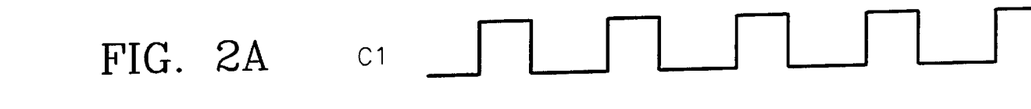
FIGS. 2A through 2G, and 2H are waveform diagrams of first through fifth control signals, and the boosted output voltage Vout, respectively.
Figure 2B:
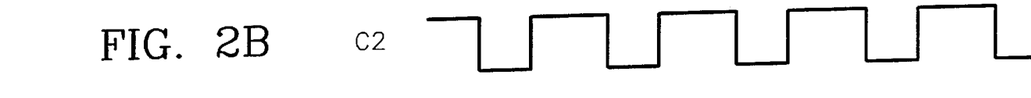
Figure 2C:
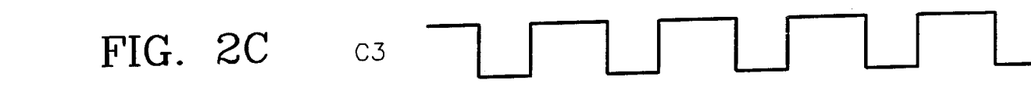
Figure 2D:
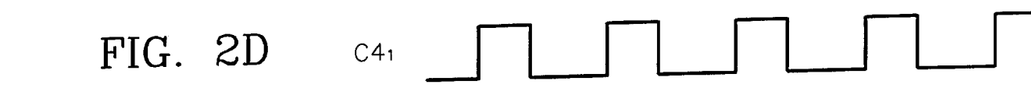
Figure 2E:
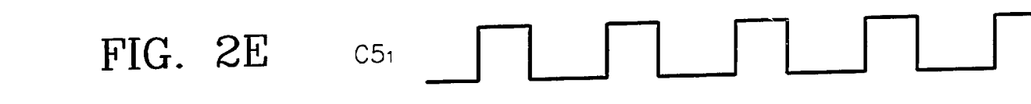
Figure 2F:
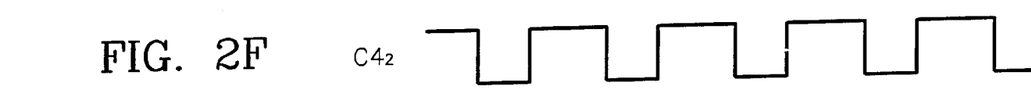
Figure 2G:
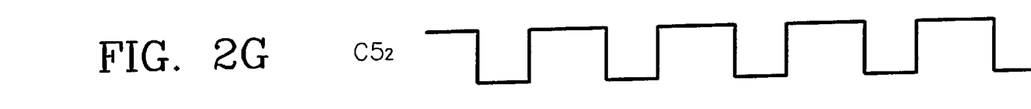
Figure 2H:
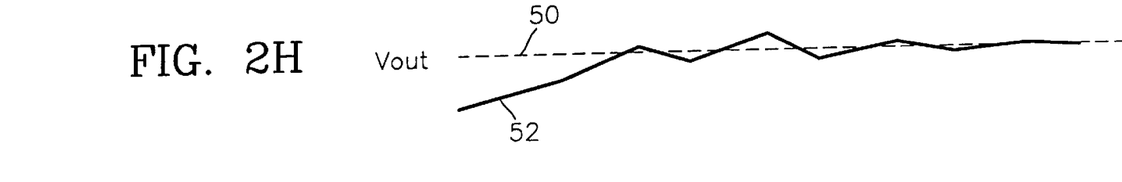

FIGS. 2A through 2H show waveforms of the first through the fifth control signals and the boosted voltage Vout. FIG. 2A represents the waveform of the first control signal C1. FIG. 2B represents the waveform of the second control signal C2. FIG. 2C represents the waveform of the third control signal C3. FIG. 2D represents the waveform of the fourth control signal $C4_1$. FIG. 2E represents the waveform of the fifth control signal $C5_1$. FIG. 2F represents the waveform of a fourth control signal $C4_2$ for an additional boosting/pumping stage. FIG. 2G represents the waveform of a fifth control signal $C5_2$ for an additional boosting/pumping stage. FIG. 2H represents the waveform of the resulting boosted voltage Vout.

Referring to FIGS. 2A through 2H, the operation of the voltage boosting circuit shown in FIG. 1 for boosting the input voltage Vin to a target level is described as follows.

The voltage boosting circuit shown in FIG. 1 consists of the first switching transistor 10, first through Nth charging/pumping portions and the capacitor $C_{N+1}$, when boosting the input voltage Vin to a level greater than $N^*$Vin and not more than $(N+1)^*$Vin.

Assuming that the voltage boosting circuit shown in FIG. 1 boosts the input voltage Vin to $P^*$Vin (1( P <2, P is a real number), the operation of the voltage boosting circuit including the first switching transistor 10, the first charging/pumping portion 12 and the capacitor $C_{N+1}$ is described as follows.

Figure 3:
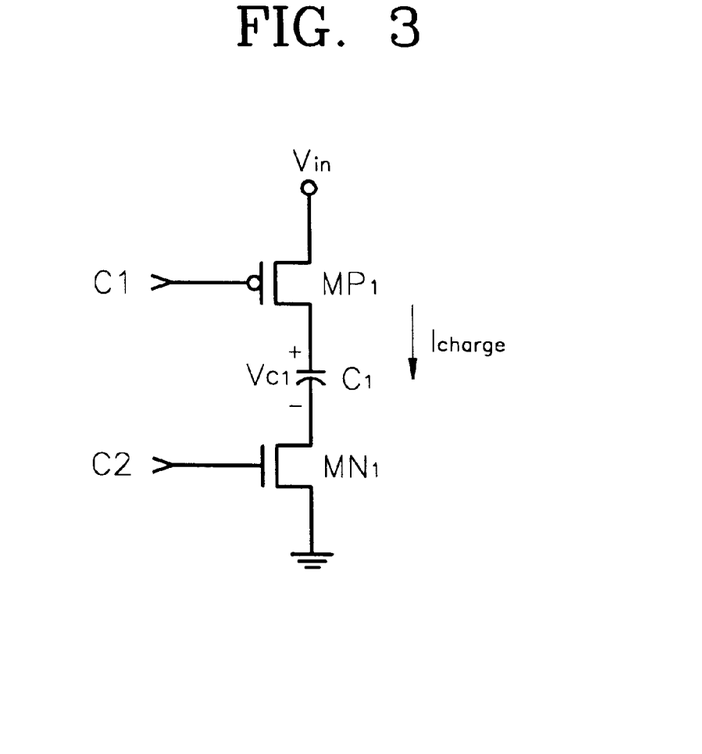
FIG. 3 is a circuit diagram for explaining the charging operation of the voltage boosting circuit shown in FIG. 1 for boosting the input voltage Vin to $P^*Vin$.

FIG. 3 shows a circuit diagram for explaining the charging operation of the voltage boosting circuit shown in FIG. 1 for boosting the input voltage Vin to $P^*$Vin. The circuit shown in FIG. 3 consists of a PMOS transistor $MP_1$, an NMOS transistor $MN_1$, and a capacitor $C_1$.

The PMOS transistor $MP_1$ is turned on when the first control signal C1 shown in FIG. 2A is input at a low logic level, the NMOS transistor $MN_1$ is turned on when the second control signal C2 shown in FIG. 2B is input at a high logic level, and the PMOS transistors $MP_2$ and $MP_3$ are turned off when the third control signal C3 shown in FIG. 2C is input at a high logic level. That is, the first and the second control signals C1 and C2 shown in FIG. 2A and FIG. 2B are active at the same time, and the third control signal C3 shown in FIG. 2C is inactive when the first and the second control signals C1 and C2 are active. Therefore, the voltage boosting circuit shown in FIG. 1 substantially operates as a charging circuit as shown in FIG. 3.

Referring to FIG. 3, the charging current $I_{charge}$ flows through the PMOS transistor $MP_1$ and the NMOS transistor $MN_1$. Then, the ideal voltage charged in the capacitor $C_1$ is the input voltage Vin, when the PMOS transistor $MP_1$ and NMOS transistor $MN_1$ are sufficiently saturated, i.e, the resistances of the transistors $MP_1$ and $MN_1$ are nearly $0\Omega$. However, the real voltage charged in the capacitor $C_1$ is smaller than the input voltage Vin. In order to compensate for this, the aspect ratio $W_1/L$ of the PMOS transistor $MP_1$ should be designed to be a predetermined number of times, for example 1.2 times, larger than the aspect ratio $W_2/L$ of the NMOS transistor $MN_1$. Therefore, the efficiency $\eta$ of the voltage boosting circuit is improved according to the following relationship:

$$\eta = \frac{V_{outr}}{V_{outt}} \times 100\%$$

where $V_{outr}$ represents the real boosted voltage output from the output terminal Vout, and $V_{outt}$ represents the voltage boosted to the target level.

Figure 4:
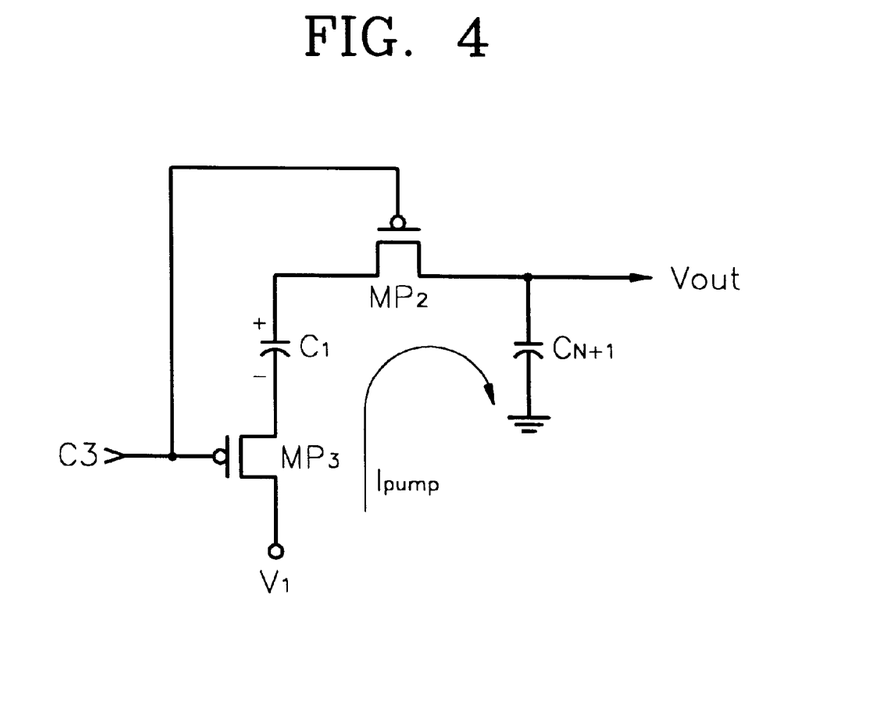
FIG. 4 is a circuit diagram for explaining the pumping operation of the voltage boosting circuit shown in FIG. 1 for boosting the input voltage Vin to $P^*Vin$.

FIG. 4 shows a circuit diagram for explaining the pumping operation of the voltage boosting circuit shown in FIG. 1 for boosting the input voltage Vin to $P^*$Vin. The circuit shown in FIG. 4 consists of the PMOS transistors $MP_2$ and $MP_3$, and the capacitors $C_1$ and $CN+1$.

The PMOS transistor $MP_1$ is turned off when the level of the first control signal C1 shown in FIG. 2A changes from a low logic level to a high logic level, and the NMOS transistor $MN_1$ is turned off when the level of the second control signal C2 shown in FIG. 2B changes from a high logic level to a low logic level. Then, the PMOS transistors $MP_2$ and $MP_3$ are turned on when the level of the third control signal C3 shown in FIG. 2C changes from a high logic level to a low logic level. That is, the third control signal C3 becomes active when the first and the second control signals C1 and C2 are inactive. Accordingly, the voltage boosting circuit shown in FIG. 1 operates as shown in FIG. 4.

Referring to FIG. 4, the capacitor $C_{N+1}$ is provided with the pumping current $I_{pump}$ through the PMOS transistor $MP_2$, which corresponds to the sum Vin+$V_1$ of the first predetermined voltage $V_1$ and the input voltage Vin previously charged in the capacitor $C_1$. By the above operation, the voltage Vin+$V_1$ charged in the capacitor $C_{N+1}$. may be output through the output terminal Vout as the boosted voltage shown in FIG. 2H. Then, the level 52 of the voltage charged in the capacitor $C_{N+1}$ gradually approaches the target level 50 of the boosted voltage after the first predetermined time passes, as shown in FIG. 2H.

Through the above operation, the voltage at the negative plate (−) of the capacitor $C_1$ varies between the reference voltage Vss and $V_1$, and the voltage at the positive plate (+) of the capacitor $C_1$ varies between Vin and Vin+$V_1$.

For example, in order to boost the input voltage Vin to $2^*$Vin(P=2) it is determined that the level of the first predetermined voltage $V_1$ becomes the level of the input voltage Vin. However, in order to boost the input voltage Vin to $1.5^*$Vin, it is determined that the level of the first predetermined voltage $V_1$ becomes $0.5^*$Vin. That is, the level of the predetermined voltage $V_1$ is not more than the level of the input voltage Vin. Here, the capacitance of the capacitor $C_1$ is the same as that of the capacitor $C_{N+1}$.

On the other hand, assuming that it is desired that the voltage boosting circuit shown in FIG. 1 boosts the input voltage Vin to $Q^*$Vin(2(Q<3, Q is a real number), the operation of the voltage boosting circuit including the first switching transistor 10, the first and the second charging/pumping portions 12 and 14, and the capacitor $C_{N+1}$ is described as follows.

Figure 5:
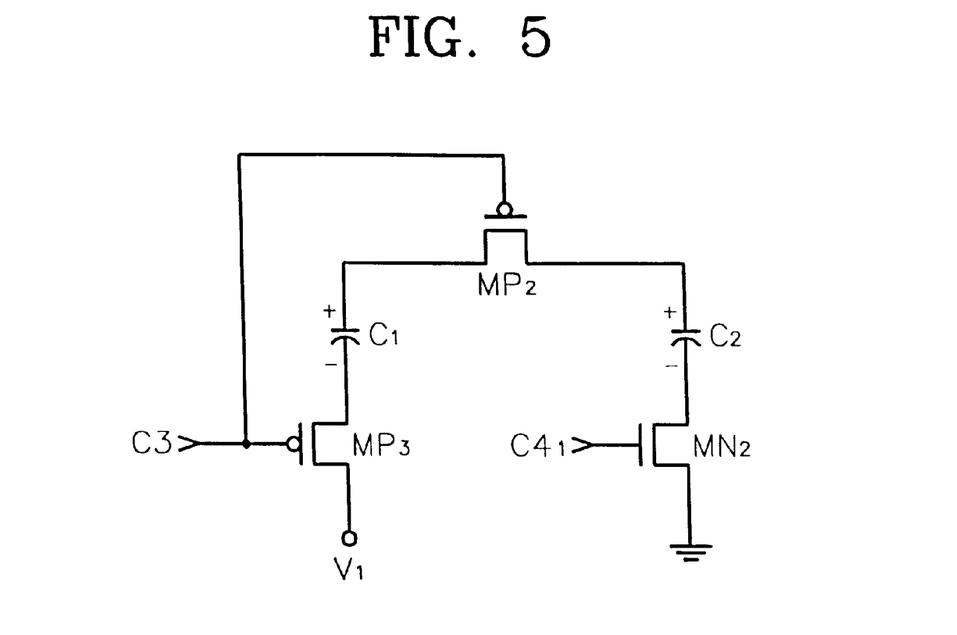
FIG. 5 is a circuit diagram for explaining the charging operation of the voltage boosting circuit shown in FIG. 1 for boosting the input voltage Vin to $Q^*Vin$.

FIG. 5 shows a circuit diagram for explaining the charging operation of the voltage boosting circuit shown in FIG. 1 for boosting the input voltage Vin to $Q^*$Vin. The circuit shown in FIG. 5 consists of the PMOS transistors $MP_2$ and $MP_3$, an NMOS transistor $MN_2$, and the capacitors $C_1$ and $C_2$.

For boosting the input voltage Vin to $Q^*$Vin, the voltage boosting circuit shown in FIG. 1 firstly charges the capacitor $C_1$ to the input voltage Vin by operating as shown in FIG. 3. Then, the NMOS transistor $MN_1$ is turned off and the PMOS transistors $MP_2$ and $MP_3$ are turned on when the levels of both the second and the third control signals C2 and C3, shown in FIG. 2B and FIG. 2C change from a high logic level to a low logic level. Here, the NMOS transistor $MN_2$ is turned on and PMOS transistors $MP_4$ and $MP_5$ are turned off when the levels of both the fourth and the fifth control signals $C4_1$ and $C5_1$ shown in FIGS. 2D and 2E change from a low logic level to a high logic level. Therefore, the voltage boosting circuit shown in FIG. 1 pumps the voltage Vin+$V_1$ at the positive plate (+) of the capacitor $C_1$, which is the sum of the first predetermined voltage $V_1$ and the voltage Vin charged in the capacitor $C_1$ to the capacitor $C_2$ through the PMOS transistor $MP_2$, as shown in FIG. 5. Finally, the voltage Vin+$V_1$ is charged in the capacitor $C_2$.

Figure 6:
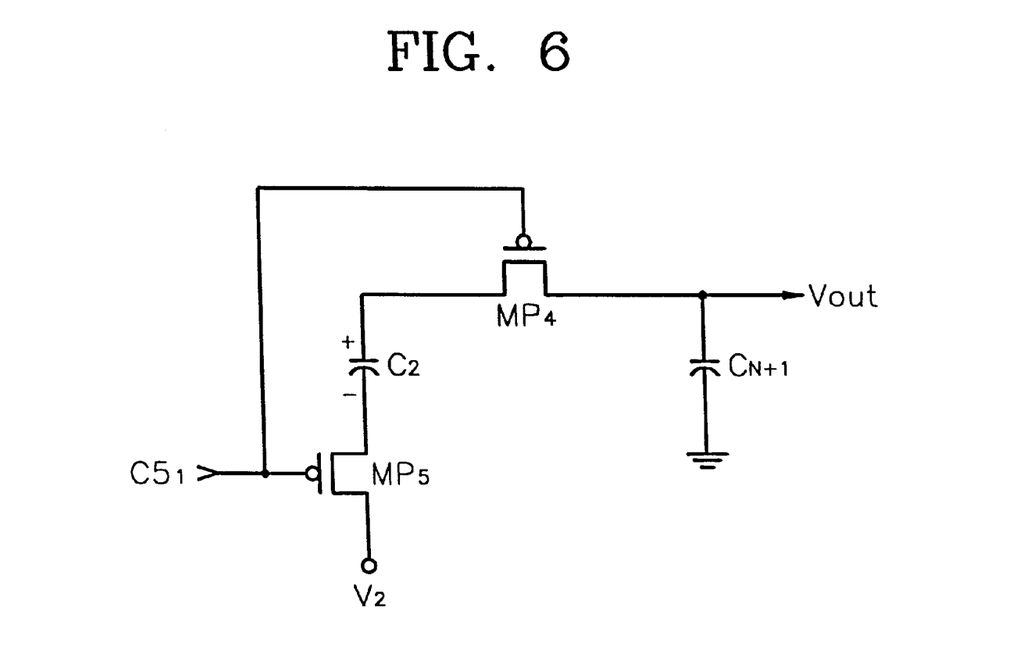
FIG. 6 is a circuit diagram for explaining the pumping operation of the voltage boosting circuit shown in FIG. 1 for boosting the input voltage Vin to $Q^*Vin$.

FIG. 6 shows a circuit diagram for explaining the pumping operation of the voltage boosting circuit shown in FIG. 1 for boosting the input voltage Vin to $Q^*$Vin. The circuit shown in FIG. 6 consists of the PMOS transistors $MP_4$ and $MP_5$, and the capacitors $C_2$ and $C_{N+1}$.

The NMOS transistor $MN_2$ is turned off when the level of the fourth control signal $C4_1$ shown in FIG. 2D changes from a high logic level to a low logic level, and the PMOS transistors $MP_4$ and $MP_5$ are turned on when the level of the fifth control signal $C5_1$ shown in FIG. 2E changes from a high logic level to a low logic level. Therefore, the voltage boosting circuit shown in FIG. 1 pumps the voltage Vin+ $V_1+V_2$ at the positive plate (+) of the capacitor $C_2$, to the capacitor $C_{N+1}$ through the PMOS transistor $MP_4$, as shown in FIG. 6. By the above operation, the voltage Vin+$V_1+V_2$ charged in the capacitor $C_{N+1}$ is output through the output port Vout as the boosted voltage which is obtained by boosting the input voltage Vin to Q*Vin.

For example, in order to boost the input voltage Vin by 3*Vin (Q=3), the sum $V_1+V_2$ of the predetermined voltages $V_1$ and $V_2$ should be determined to be 2*Vin. However, in order to boost the input voltage Vin by 2.5*Vin, the sum $V_1+V_2$ of the predetermined voltages $V_1$ and $V_2$ should be determined to be 1.5*Vin. Here, the capacitances of the capacitors $C_1$, $C_2$ and $C_{N+1}$ are preferably all the same.

From the above operation, the voltage at the negative plate (−) of the capacitor $C_2$ varies between the reference voltage and $V_2$, and the voltage at the positive plate (+) of the capacitor $C_2$ varies between Vin+$V_1$ and Vin+$V_1+V_2$.

Assuming that the voltage boosting circuit shown in FIG. 1 boosts the input voltage Vin to R*Vin (3(R<4, R is a real number), the operation of the voltage boosting circuit including the first switching transistor 10, the first, the second and the third charging/pumping portions, and the capacitor $C_{N+1}$ is described as follows.

Figure 7:
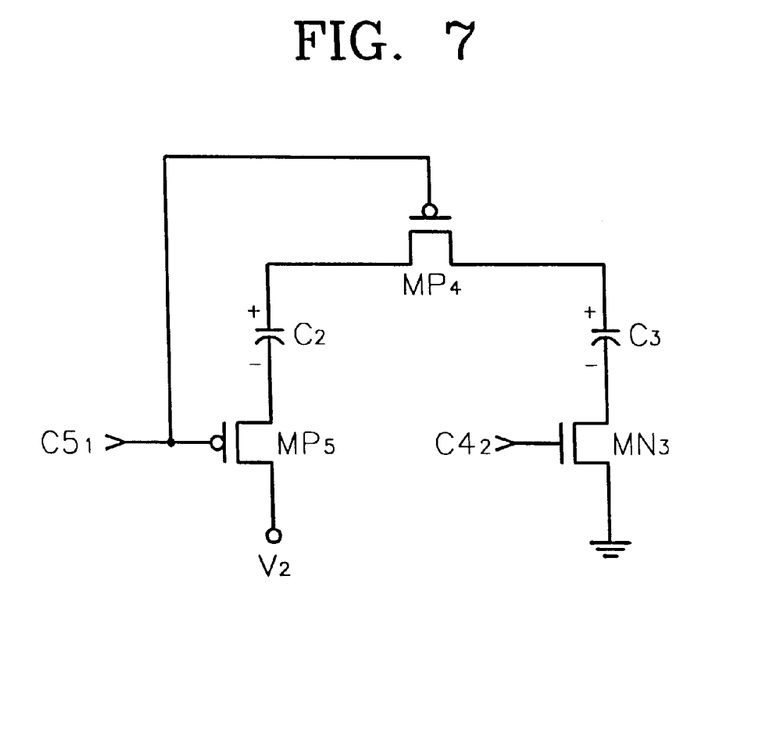
FIG. 7 is a circuit diagram for explaining the charging operation of the voltage boosting circuit shown in FIG. 1 for boosting the input voltage Vin to $R^*Vin$.

FIG. 7 shows a circuit diagram for explaining the charging operation of the voltage boosting circuit shown in FIG. 1 for boosting the input voltage Vin to R*Vin. The circuit shown in FIG. 7 consists of PMOS transistors $MP_4$ and $MP_5$, NMOS transistor $MN_3$, and capacitors $C_2$ and $C_3$.

For boosting the input voltage Vin to R*Vin, the voltage boosting circuit shown in FIG. 1 firstly charges the voltage Vin+$V_1$ in the capacitor $C_2$ by operating as shown in FIGS. 3 and 5. Then, the PMOS transistors $MP_4$ and $MP_5$ are turned on when the level of the fifth control signal $C5_1$ shown in FIG. 2E changes from a high logic level to a low logic level, and the NMOS transistor $MN_3$ is turned on when the level of the fourth control signal $C4_2$ shown in FIG. 2F changes from a low logic level to a high logic level. Therefore, the voltage boosting circuit shown in FIG. 1 pumps the voltage Vin+$V_1+V_2$ at the positive plate (+) of the capacitor $C_2$, to the capacitor $C_3$ through the PMOS transistor $MP_4$, as shown in FIG. 7. Finally, the voltage Vin+$V_1+V_2$ is charged in the capacitor $C_3$.

Figure 8:
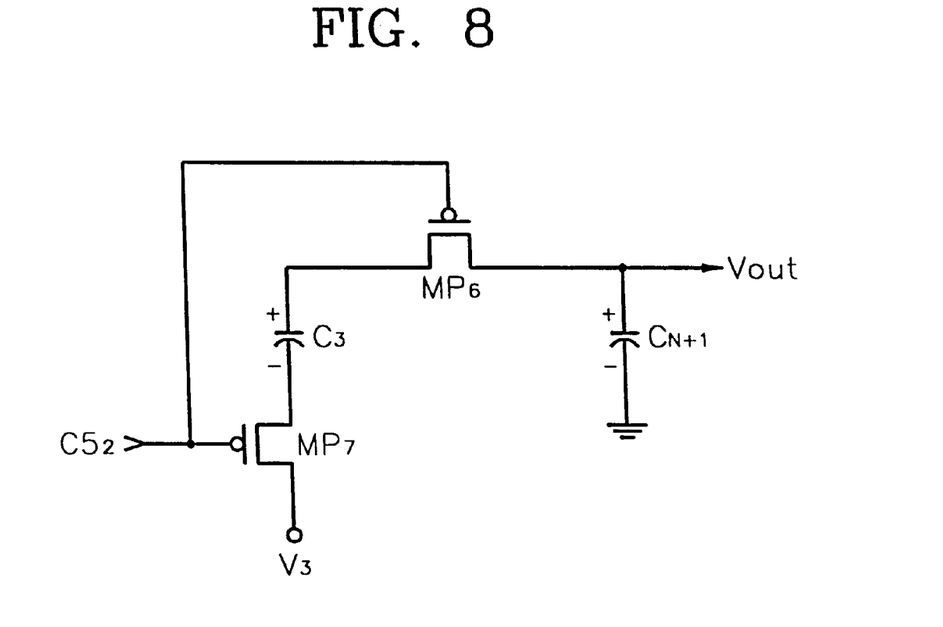
FIG. 8 is a circuit diagram for explaining the pumping operation of the voltage boosting circuit shown in FIG. 1 for boosting the input voltage Vin to $R^*Vin$.

FIG. 8 shows a circuit diagram for explaining the pumping operation of the voltage boosting circuit shown in FIG. 1 for boosting the input voltage Vin to R*Vin. The circuit shown in FIG. 8 consists of the PMOS transistors $MP_6$ and $MP_7$, and the capacitors $C_3$ and $C_{N+1}$.

The NMOS transistor $MN_3$ is turned off when the level of the fourth control signal $C4_2$ shown in FIG. 2F changes from a high logic level to a low logic level, and the PMOS transistors $MP_6$ and $MP_7$ are turned on when the level of the fifth control signal $C5_2$ shown in FIG. 2G changes from a high logic level to a low logic level. Therefore, the voltage boosting circuit shown in FIG. 1 pumps the voltage Vin+$V_1+V_2+V_3$ at the positive plate (+) of the capacitor $C_3$ to the capacitor $C_{N+1}$ through the PMOS transistor $MP_6$, as shown in FIG. 8. By the above operation, the voltage Vin+$V_1+V_2+V_3$ charged in the capacitor $C_{N+1}$ is output through the output port Vout as the boosted voltage which is obtained by boosting the input voltage Vin to R*Vin.

For example, in order to boost the input voltage Vin by 4*Vin (R=4), the sum $V_1+V_2+V_3$ of the predetermined voltages $V_1$, $V_2$ and $V_3$ should be determined to be 3*Vin. However, in order to boost the input voltage Vin by 3.5*Vin, the sum $V_1+V_2+V_3$ of the predetermined voltages $V_1$, $V_2$ and $V_3$ should be determined to be 2.5*Vin. Here, the capacitances of the capacitors $C_1$, $C_2$, $C_3$ and $C_{N+1}$ are all the same.

From the above operation, it is known that the voltage at the negative plate (−) of the capacitor $C_3$ varies between the reference voltage Vss and $V_3$, and the voltage at the positive plate (+) of the capacitor $C_3$ varies between Vin+$V_1+V_2$ and Vin+$V_1+V_2+V_3$.

In the above operation of the voltage boosting circuit shown in FIG. 1, the voltage to which the input voltage Vin is boosted is limited to be not more than 4*Vin. However, the voltage boosting circuit of the present invention can boost the input voltage Vin to greater than 4*Vin by serially attaching a predetermined number of charging/pumping portion(s) to the third charging/pumping portion.

Meanwhile, the NMOS transistor MN1 and the PMOS transistors $MP_1$, $MP_2$ and $MP_3$ can be simultaneously be turned on when the second and third control signals C2 and C3, respectively, shown in FIGS. 2B and 2C are alternately active. When a turned-on MOS transistor is turned off or the turned-off MOS transistor is turned on, a time delay which is represented as a turned-off time or a turned-on time is induced due to the parasitic capacitance component of the MOS transistor. If the PMOS transistor $MP_3$ is turned on before the NMOS transistor $MN_1$ is turned off, a current path is formed by the input voltage Vin, the PMOS transistor $MP_3$, the NMOS transistor $MN_1$ and the reference voltage Vss. Here, the formed current path can generate an undesirable leakage current, thereby increasing the power consumption of the voltage boosting circuit. In order to prevent this, i.e. improving the efficiency expressed by the above equation, the third control signal C3 should be active when a second predetermined time passes after the first and the second control signals C1 and C2 shown in FIGS. 2A and 2B are inactive. Or, alternatively, the second control signal C2 should be active when a third predetermined time passes after the third control signal C3 is inactive. Here, the second predetermined time is consistent with the turn-off time required for turning off the transistors $MP_1$ and $MN_1$, and the third predetermined time is consistent with the turn-off time required for turning off the transistors $MP_2$ and $MP_3$. That is, it is desirable to delay activating the third control signal C3 for the time required for turning off the transistors $MP_1$ and $MN_1$, and to delay activating the first and the second control signals C1 and C2 for the time required for turning off the PMOS transistors $MP_2$ and $MP_3$.

Similarly, leakage current can be generated due to the current path formed if the NMOS transistor MN, and the PMOS transistor $MP_{2X+1}$ are simultaneously turned on when the fourth and the fifth control signals $C4_{X-1}$ and $C5_{X-1}$ are alternately active. In order to prevent this, it is desirable to activate the fifth control signal $C5_{X-1}$ in passing the turn-off time required for turning off the NMOS transistor MNx after the fourth control signal $C4_{X-1}$ is inactive, or to activate the fourth control signal $C4_{X-1}$ in passing turn-off time required for turning off the PMOS transistor MPx after the fifth control signal $C5_{X-1}$ is inactive.

Accordingly, the desired ideal voltage Vin+. . . +$V_{X-1}$ can be charged in the capacitor $C_X$ when the PMOS transistors $MP_X$ and $MP_{X+1}$ are ideally saturated. However, the real voltage charged in the capacitor $C_X$ is lower than the ideal voltage Vin+ . . . +$V_{X-1}$. To compensate for this, i.e., to improve the efficiency expressed by the above equation, the aspect ratio of the PMOS transistor $MP_{X+1}$ is preferably set to be larger than that of the PMOS transistor $MP_X$.

Figure 9:
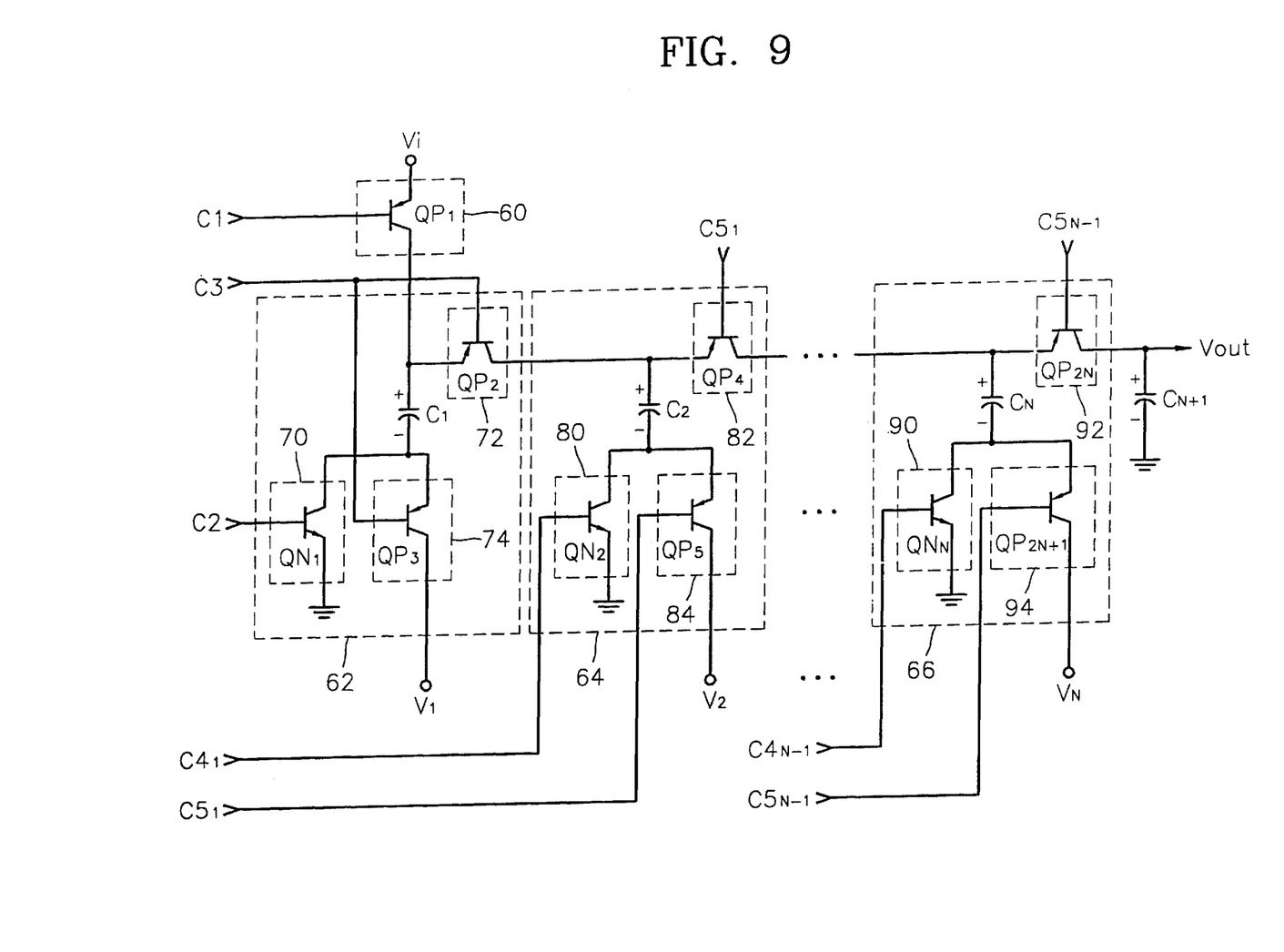
FIG. 9 is a circuit diagram of a second preferred embodiment of the voltage boosting circuit according to the present invention.

FIG. 9 is a circuit diagram of another preferred embodiment of a voltage boosting circuit according to the present invention. The voltage boosting circuit includes a first switching transistor 60, first through Nth charging/pumping portions 62, 64, . . . , and 66, and a capacitor $C_{N+1}$.

The first switching transistor 60, and the first through Nth charging/pumping portions 62, 64, . . . and 66 shown in FIG. 9 perform the same operations as the first switching transistor 10, and the first through Nth charging/pumping portions 12, 14, . . . and 16 shown in FIG. 1, respectively. Here, each switching transistor shown in FIG. 9 may be implemented by a bipolar transistor, instead of a MOS transistor. That is, a PNP transistor is substituted for a P-channel MOS transistor, and an NPN transistor is substituted for an N-channel MOS transistor. Accordingly, since the operating principle of the voltage boosting circuit shown in FIG. 9 is the same as that of the boosting circuit shown in FIG. 1, the reference numbers of respective control signals and the notations of the capacitors used in FIG. 9 are the same as those used in FIG. 1.

The construction of the voltage boosting circuit shown in FIG. 9 is described as follows.

The first switching transistor 60 may be implemented by a PNP transistor $QP_1$ having a base connected to the first control signal C1, and an emitter and a collector connected between the input voltage Vin and the first charging/pumping portion 62.

The first charging/pumping portion 62 includes a capacitor $C_1$, and a second, a third and a fourth switching transistors 70, 74 and 72. Here, the positive plate (+) of the capacitor $C_1$ is electrically connected to the input voltage Vin transferred from the first switching transistor 60. The second switching transistor 70 is implemented by an NPN transistor $QN_1$ for connecting the negative plate (−) of the capacitor $C_1$ to the reference voltage in response to the second control signal C2. The third switching transistor 74 is implemented by a PNP transistor $QP_3$ for connecting the negative plate (−) of the capacitor $C_1$ to the first predetermined voltage $V_1$ in response to the third control signal. The fourth switching transistor 72 is implemented by a PNP transistor $QP_2$ for transferring the voltage at the positive plate (+) of the capacitor $C_1$ to the capacitor $C_{N+1}$ in response to the third control signal C3.

Meanwhile, the voltage boosting circuit shown in FIG. 9 can further be provided with second through Nth(2<N) charging/pumping portions 64, . . . , and 66 according to the target level to which the input voltage is to be boosted, as shown in the voltage boosting circuit of FIG. 1.

Here, the voltage which is pumped from the first or the Nth charging/pumping portion 62 or 66 to the capacitor $C_{N+1}$ is output through the output port Vout as the boosted voltage.

With the exception of capacitors $C_1$, . . . , and $C_{N+1}$, components of the voltage boosting circuits shown in FIGS. 1 and 9 can be integrated and used for the integrated semiconductor circuit in order to generate the required boosted voltage.

FIGS. 10A through 10D are schematic diagrams of the integrated voltage boosting circuits of the present invention. FIG. 10A, 10B, 10C and 10D show the schematic diagrams of the voltage boosting circuits which can boost the input voltage Vin to $P^*Vin$, $Q^*Vin$, $R^*Vin$ and $N^*Vin$, respectively.

Figure 10A:
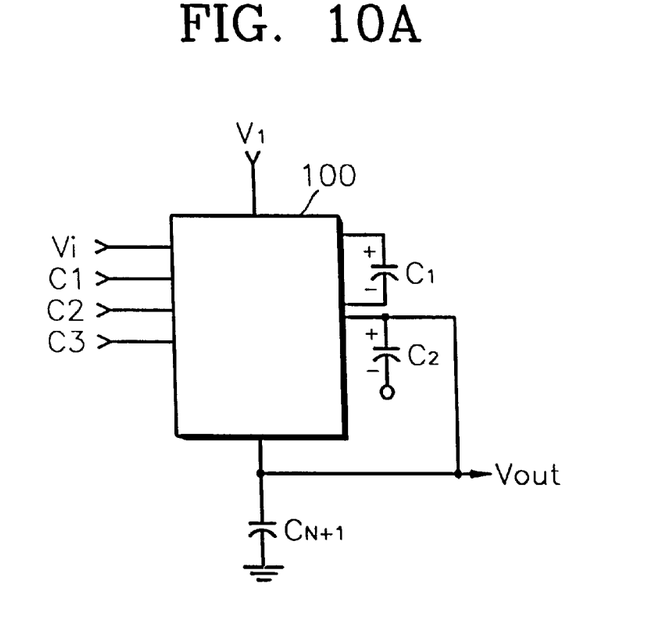
FIG. 10A through FIG. 10D are schematic block diagrams of the integrated voltage boosting circuits of the present invention.
Figure 10B:
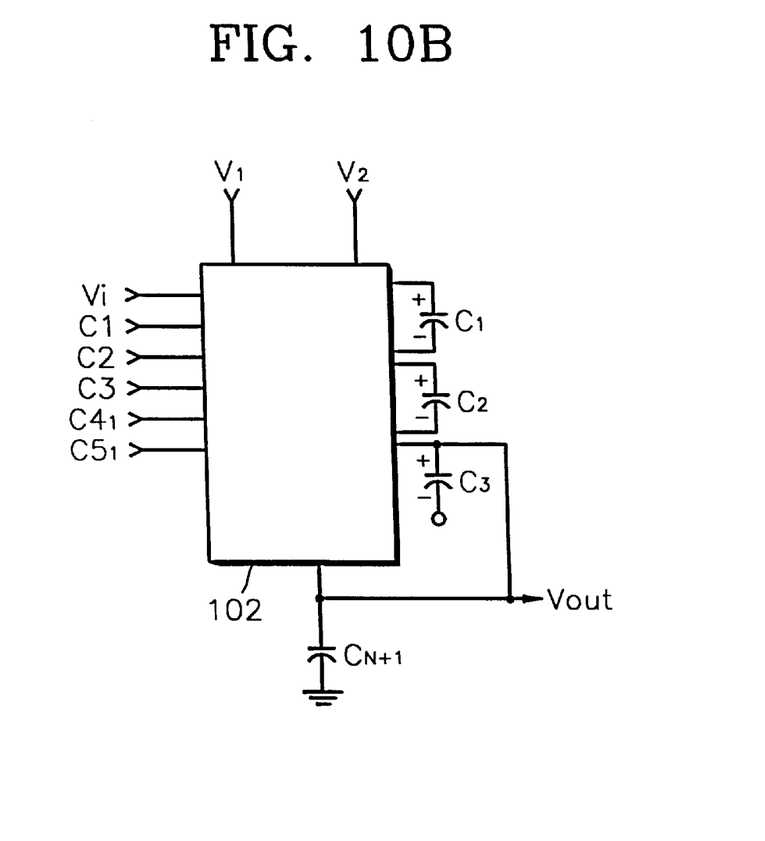
Figure 10C:
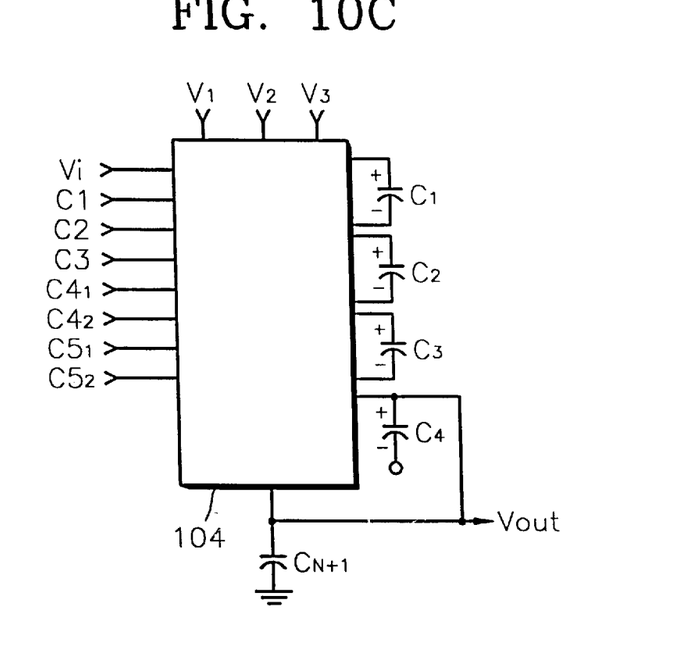
Figure 10D:
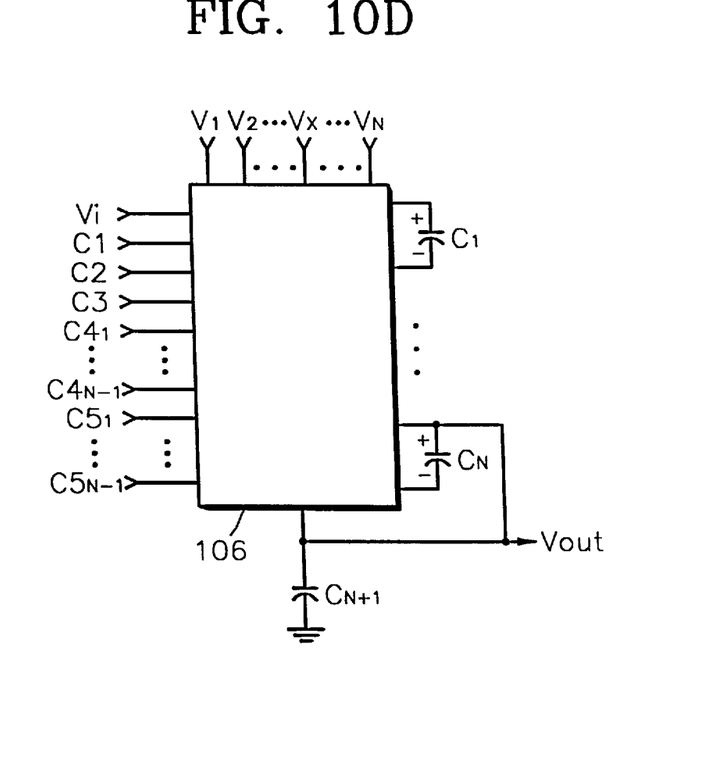

Assuming that the voltage boosting circuit shown in FIG. 1 boosts the input voltage Vin to $R^*Vin$, the voltage boosting circuit shown in FIG. 1 has separately attached capacitors $C_1$, $C_2$, $C_3$ and $C_{N+1}$ external to the integrated circuit IC 104 as shown in FIG. 10C. Here, the negative plate (−) of the capacitor $C_4$ is open, and the positive plate (+) of the capacitor $C_4$ is connected to the output terminal Vout. Likewise, if the voltage boosting circuit shown in FIG. 1 boosts the input voltage Vin to $P^*Vi$, the voltage boosting circuit shown in FIG. 1 has separately attached capacitors $C_1$, and $C_{N+1}$ external to the integrated circuit IC 100 as shown in FIG. 10A. Here, the negative plate (−) of the capacitor $C_2$ is open, and the positive plate (+) of the capacitor $C_2$ is connected to the output terminal Vout. Also, when the voltage boosting circuit shown in FIG. 1 boosts the input voltage Vin to $Q^*Vi$, the voltage boosting circuit shown in FIG. 1 has separately attached capacitors $C_1$, $C_2$ and $C_{N+1}$ external to the integrated circuit IC 102 as shown in FIG. 10B. Here, the negative plate (−) of the capacitor $C_3$ is open, and the positive plate (+) of the capacitor $C_3$ is connected to the output terminal Vout.

That is, the user should open the negative plate (−) of the corresponding capacitor according to the desired level to which to be boosted. Finally, the voltage boosting circuit shown in FIG. 1 of the present invention can alternatively be implemented as an integrated circuit 106 shown in FIG. 10D, which boosts the input voltage Vin to $N^*Vin$.

The boosting method performed in the above voltage boosting circuit is described with reference to the attached drawings as follows.

Figure 11:
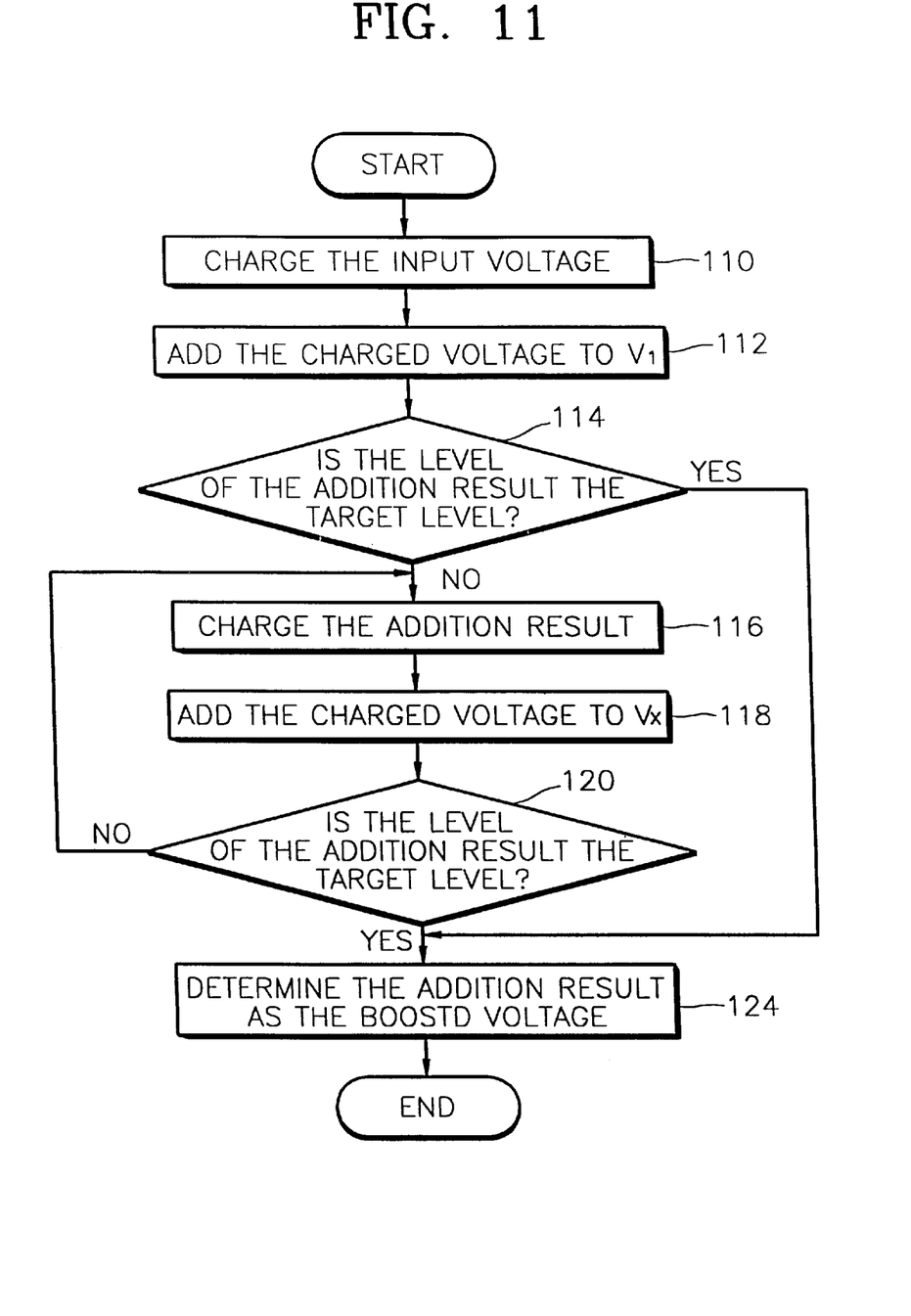
FIG. 11 is a flow diagram for describing the voltage boosting method according to the present invention.

FIG. 11 shows a flowchart for describing the boosting method according to the present invention, performed in the circuit shown in FIGS. 1 or 9. The method includes the steps 110 through 124 for boosting the input voltage using the charging/pumping operations of at least two capacitors.

Referring to FIG. 11, a controller (not shown) applies the control signals Cl, C2 and C3 to the voltage boosting circuit shown in FIG. 1 or FIG. 9 as described above, such that the input voltage Vin is charged in the capacitor $C_1$(step 110). After step 110, the input voltage Vin charged in the capacitor $C_1$ is added to the first predetermined voltage $V_1$, according to the control signals $C_1$, $C_2$ and $C_3$ applied by the controller (step 112). Here, the voltage boosting circuit shown in FIG. 1 or 9 is designed as shown in FIGS. 10A, 10B, 10C or 10D, according to the target level to which the input voltage Vin is to be boosted.

After step 112, the controller(not shown) determines whether the level of the addition result, that is, Vin+$V_1$, is the target level to which the input voltage Vin is to be boosted (step 114). For step 114; the controller inputs the addition result i.e. each output of the first through the Nth charging/pumping portions, and compares the addition result with the target level.

If the level of the addition result is the desired level, that is, the target level, the addition result is output as the boosted voltage Vout(step 124). For example, if the target level is double the level of the input voltage, the voltage boosting circuit shown in FIG. 1 or 9 consists of the first switching transistor 10 or 60, the first charging/pumping portion 12 or 62 and the capacitor $C_{N+1}$, and the output of the first charging/pumping portion 12 or 62 is not connected to the second charging/pumping portion 14 or 64 but the positive plate (+) of the capacitor $C_{N+1}$. Then, the addition result $2^*Vin$ output from the first charging/pumping portion and charged in the capacitor $C_{N+1}$ is determined as the boosted voltage Vout. To achieve this, the predetermined voltage $V_1$ is predetermined as Vin.

However, if the level of the addition result is not the target level, the controller (not shown) generates the fourth and the fifth control signals $C4_1$ and $C_5$ so that the addition result can be charged again in the capacitor $C_2$(step 116). Here, the controller (not shown) generates the fourth and fifth control signals $C4_1$ and $C5_1$ according to the result of comparing the target level with the level of the result added in step 112.

After step 116, the controller (not shown) generates the fourth and the fifth control signals $C4_1$ and $C5_1$ so that the voltage charged in the capacitor $C_2$ can be added to the second predetermined voltage $V_2$(step 118).

After step 118, it is determined by the controller whether the voltage output from the second charging/pumping portion which is the level of the result added in step 118 is the target level (step 120).

If the level $Vin+V_1+V_2$ of the result added in step 118 is the target level, the voltage, i.e., the addition result output from the second charging/pumping portion and charged in the capacitor $C_{N+1}$ is determined as the boosted voltage (step 124). For example, if the target level to which the input voltage Vin is to be boosted is 3*Vin, the voltage boosting circuit shown in FIG. 1 or 9 consists of the first switching transistor 10 or 60, first and second charging/pumping portions and the capacitor $C_{N+1}$, and the sum $V_1+V_2$ of the predetermined voltages $V_1$ and $V_2$ is predetermined as 2*Vin. Here, the controller determines the voltage at the positive plate (+) of the capacitor $C_{N+1}$ as the boosted voltage Vout, since the level of the addition result output from the second charging/pumping portion is the target level.

However, if it is determined that the level of the addition result is not the target level in step 120, it proceeds to step 116. For example, if the target level is 4*Vin, the circuit shown in FIG. 1 or 9 consists of the first switching transistor 10 or 60, the first through the third charging/pumping portions and the capacitor $C_{N+1}$, and the sum $V_1+V_2+V_3$ of the predetermined voltages $V_1$, $V_2$ and $V_3$ is predetermined as 3*Vin. Here, the third charging/pumping portion shown in FIG. 1 or 9 again performs the steps 116 and 118. That is, as shown in FIG. 7, the voltage $Vin+V_1+V_2$ at the positive plate (+) of the capacitor $C_2$ is charged in the capacitor $C_3$ in step 116, and the charged voltage $Vin+V_1+V_2$ is added to the voltage $V_3$ in step 118. Accordingly, the addition result 4*Vin output from the third charging/pumping portion and charged in the capacitor $C_{N+1}$ is determined as the boosted voltage Vout.

The above-described steps 116 and 118 are performed in the voltage boosting circuit shown in FIG. 1 or 9, in response to the control signals $C4_{X-1}$ and $C5_{X-1}$ generated from the controller. That is, if the level of the boosted voltage is not the target level, the control signals $C4_{X-1}$ and $C5_{X-1}$ are generated so that the corresponding charging/pumping portions can continuously perform the charging/pumping operation. However, if the level of the boosted voltage is the target level, the charging/pumping operation stops and the voltage charged in the capacitor $C_{N+1}$ is determined as the boosted voltage Vout.

Meanwhile, the controller(not shown) may sequentially generate the corresponding control signals $C_1$, $C_2$, $C_3$, $C4_1$, $C5_1$, $C4_2$ and $C5_2$, as shown in FIGS. 2A through 2G, without inputting the outputs of the first through the Nth charging/pumping portions. For example, when the circuit boostes the input voltage to 3*Vin, the controller generates the first, the second, the third, the fourth and the fifth control signals $C_1$, $C_2$, $C_3$, $C4_1$ and $C5_1$ so that the circuit shown in FIG. 1 or 9 can operate according to the order of the circuits shown in FIG. 3, FIG. 5 and FIG. 6.

The above-described voltage boosting circuit and method thereof of the present invention can arbitrarily boost the input level to any desired level while consuming a relatively small amount of power using only a relatively small number of elements, minimize the area of the chip in which the above circuit is integrated, improve the boosting efficiency, and reduce the manufacturing cost.

While this invention has been particularly shown and described with references to preferred embodiments thereof, it will be understood by those skilled in the art that various changes in form and details may be made therein without departing from the spirit and scope of the invention as defined by the appended claims.

For example, the MOS transistors described above and the bipolar transistors may be replaced by switching elements which perform the same function.

What is claimed is:

1. A voltage boosting circuit for boosting an input voltage, and for outputting a boosted voltage, comprising:

a first switching means for transferring the input voltage in response to a first periodic control signal; and a first charging/pumping means for charging the input voltage transferred from the first switching means in response to a second periodic control signal to provide a charged voltage, for adding the charged voltage to a first predetermined voltage in response to a third periodic control signal to provide a sum voltage, and for pumping the sum voltage in response to the third periodic control signal to provide a boosted voltage.

2. The voltage boosting circuit according to claim 1, wherein the level of the first predetermined voltage is not more than the level of the input voltage.

3. The voltage boosting circuit according to claim 1, wherein the first and second control signals are substantially simultaneously active or inactive the first and the third control signals are alternately active.

4. The voltage boosting circuit according to claim 1, wherein the voltage boosting circuit further comprises a second through an Nth (where N>2) charging/pumping means, wherein an Xth (where 2<X<N) charging/pumping means charges the boosted output voltage of an X-1th charging/pumping means in response to a fourth control signal to provide an Xth charged voltage, adds the Xth charged voltage to an Xth predetermined voltage in response to a fifth control signal to provide an Xth sum voltage, and pumps the Xth sum voltage response to the fifth control signal to provide an Xth boosted voltage.

5. The voltage boosting circuit according to claim 4, wherein the level of the second predetermined voltage is not more than the level of the input voltage.

6. The voltage boosting circuit according to claim 4, wherein the fourth and the fifth control signals are alternately active.

7. The voltage boosting circuit according to claim 4, wherein said first charging/pumping means comprises:

a first capacitor having a first terminal electrically coupled to the input voltage transferred from the first switching means;

a second switching means for connecting a second terminal of the first capacitor to a reference voltage in response to the second control signal;

a third switching means for connecting the second terminal of the first capacitor to the first predetermined voltage in response to the third control signal; and a fourth switching means for transferring a voltage at the first terminal of the first capacitor as the boosted output voltage in response to the third control signal.

8. The voltage boosting circuit according to claim 7, wherein said Xth charging/pumping means comprises:

a second capacitor having a first terminal electrically coupled to the boosted output voltage of the X-1th charging/pumping means;

a fifth switching means for connecting a second terminal of the second capacitor to the reference voltage in response to the fourth control signal;

a sixth switching means for connecting the second terminal of the second capacitor to the second predetermined voltage in response to the fifth control signal; and seventh switching means for transferring a voltage at the first terminal of the second capacitor as the Xth boosted voltage in response to the fifth control signal.

9. The voltage boosting circuit according to claim 8, wherein each of the first, the third, the fourth, the sixth and the seventh switching means comprises a P-channel MOS transistor, and each of the second and wherein the fifth switching means comprises an N-channel MOS transistor.

10. The voltage boosting circuit according to claim 9, wherein the aspect ratio of the MOS transistor of the first switching means is a predetermined number of times larger than that of the MOS transistor of the second switching means.

11. The voltage boosting circuit according to claim 9, wherein the aspect ratio of the MOS transistor of the third switching means is a predetermined number of times larger than that of the MOS transistor of the fourth switching means.

12. The voltage boosting circuit according to claim 9, wherein the aspect ratio of the MOS transistor of the sixth switching means is a predetermined number of times larger than that of the MOS transistor of the seventh switching means.

13. The voltage boosting circuit according to claim 9, wherein the third control signal becomes active after a predetermined time period has passed from a time when the second control signal becomes inactive.

14. The voltage boosting circuit according to claim 9, wherein the second control signal becomes active after a predetermined time period has passed from a time when the third control signal becomes inactive.

15. The voltage boosting circuit according to claim 9, wherein the fourth control signal becomes active after a predetermined time period has passed from a time when the fifth control signal becomes inactive.

16. The voltage boosting circuit according to claim 9, wherein the fifth control signal becomes active after a predetermined time period has passed from a time when the fourth control signal becomes inactive.

17. The voltage boosting circuit according to claim 8, wherein each of the first, the third, the fourth, the sixth and the seventh switching means is a PNP transistor, and each of the second and the fifth switching means is an NPN transistor.

18. The voltage boosting circuit according to claim 9, wherein the voltage boosting circuit further comprises a third capacitor for charging the pumping result, and the voltage charged in the third capacitor is the Xth boosted voltage.

19. The voltage boosting circuit according to claim 18, wherein the first, the second and the third capacitors have substantially similar capacitance values.

20. A method for boosting the level of an input voltage to a boosted voltage having a target level, the method comprising the steps of:

(a) transferring the input voltage in response to a first periodic control signal and charging the input voltage in response to a second periodic control signal;

(b) adding the charged input voltage to a first predetermined voltage to provide a first sum voltage in response to a third periodic control signal;

(c) determining whether the sum voltage level is substantially equal to the target level;

(d) further charging the first sum voltage when the first sum voltage level is less than the target level;

(e) adding the charged result voltage level of step (d) to a second predetermined voltage to provide a second sum voltage;

(f) determining whether the second sum voltage level is substantially equal to the target level, and proceeding to the step (d) when the second sum voltage level is less than the target level; and (g) determining as the boosted voltage the result added in the step (b) or the step (e) when first or second sum voltage is substantially equal to the target level.

21. A method according to claim 20 wherein each of the first and the second predetermined voltage levels is not more than the level of the input voltage.

* * * * *